Patented Mar. 23, 1948

2,438,195

UNITED STATES PATENT OFFICE 2,438,195

PRESSURE-SENSITIVE ADHESIVE TAPE

Hubert J. Tierney, St. Paul, Minn., assignor to Minnesota Mining & Manufacturing Company, St. Paul, Minn., a corporation of Delaware No Drawing. Continuation of application Serial No. 437,831, April 6, 1942. This application December 5, 1946, Serial No. 714,151

4 Claims. (Cl. 117—122)

This application is a continuation of copending application Ser. No. 437,831, filed April 6, 1942, now abandoned, (which was filed as a continuation-in-part of Ser. No. 177,094, filed November 29, 1937).

This invention relates to an improved pressure-sensitive adhesive sheet, conveniently in the form of an adhesive tape, having a flexible unified backing provided with a coating of normally tacky and pressure-sensitive adhesive.

The backing is impregnated with a non-tacky polyacrylate elastomer (a polymerized ester of acrylic acid), which is the distinguishing feature of the present type of tape backing from the standpoint of composition.

This material is a linear eupolymer (superpolymer) having a chain structure composed of many units, each unit of which may be represented by the following structural formula:

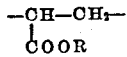

where R represents an alkyl group, such as methyl (—CH$_3$) or ethyl (—C$_2$H$_5$), or such other group as permits of polymerization to non-tacky elastomer form.

The desired eupolymer is formed by polymerization of the acrylic acid ester and polymerization is readily carried to the point where the polymer chain length results in a rubbery mass, which is quite different from resins which are soft and plastic and from resins which are horny or hard and brittle or relatively inflexible. These non-tacky rubbery acrylate polymers, with which this invention is concerned, fall within the generic class of "elastomers" (see Industrial and Engineering Chemistry, vol. 31, pages 941–945), since they are per se tough, flexible, resilient, stretchable masses. Thus a methyl acrylate elastomer superficially somewhat resembles white latex rubber, although it is water white and more transparent.

However, this material is not a mere substitute or equivalent of natural rubber, for it possesses special properties making for suitability for the present use which are not possessed or suggested by natural rubber, and natural rubber cannot be substituted for the present material to produce the desired type of adhesive tape.

The present material is not the same in properties as methacrylate polymers, and is to be distinguished therefrom.

An object of the invention is to provide an improved masking tape for use in painting, as for example, in the spray-painting of automobiles with lacquers, although the invention is of course not limited thereto.

Masking tapes heretofore have largely been of the following three types as regards the material used to impregnate or coat the backing: (a) those having a paper backing impregnated with a unifying composition which is insoluble in oils and lacquer solvents but which is undesirably hygroscopic (exemplified by tanned glue-glycerine), (b) those having a paper backing impregnated with a rubber-resin-zinc oxide unifying composition, and (c) those having a paper cloth backing provided on the back with a layer of vulcanized rubber. Without going into details, it may be said that each of these types has disadvantages. An object of this invention is to provide not merely a novel masking tape but one which is superior in various respects.

The problem of devising a superior masking tape is a very difficult one, owing to the large number of desired properties which should be present in combination. The usual difficulty is that in securing certain desired properties there is an accompaniment of undesirable properties following from the inherent nature of the materials used.

The present invention provides a masking tape having a backing which not only can be produced at a reasonable cost but which includes these desirable properties in combination: The backing is treated with a material which is non-hygroscopic and water-insoluble so that it is not affected by atmospheric conditions. The backing is not only proof against water penetration but is proof against the action or penetration of oils and many of the usual lacquer and enamel solvents. In lacquer and enamel spraying, the backing provides a barrier which prevents color bleeding, that is prevents the penetration of coloring material in colored lacquers, discoloring the underlying surface when the work is baked in an oven with the tape in place following spraying. It is not necessary to provide a backsizing, since the back surface, provided by the polyacrylate elastomer used to impregnate or coat the backing, is of a kind toward which rubber-resin pressure-sensitive adhesives do not have a special affinity, thus permitting rolls of the tape to be readily unwound and without exerting a strong pull tending to cause splitting of the backing.

The masking tape has the desired flexibility or pliancy and lack of harshness; but at the same time has the desired "body" so as not to be "limp"; without being rendered heavy. It has the right "feel" demanded by painters. Tape having a paper backing impregnated with the polyacrylate elastomer is adequately unified to prevent splitting or delamination, owing to the firm bonding of the cellulose fibres, so that the tape may be stripped from a surface in condition permitting reuse, and may be unwound from rolls without care being needed. This paper tape is tough enough to prevent accidental breaking or tearing, and yet not so tough as to make difficult the tearing off of desired lengths.

The usual types of normally tacky pressure-sensitive adhesive coatings may be applied to the backing and will adhere sufficiently firmly so as not to offset when the tape is unwound or removed from surfaces to which applied.

By using creped paper impregnated with the non-tacky polyacrylate elastomer as the backing, a masking tape can be made which has a "dead-stretch" and may be readily conformed to irregular outlines or surfaces.

The non-tacky polyacrylate elastomer may simply be dissolved in a volatile solvent (such as acetone or ethylene dichloride) and this solution used to impregnate porous paper in making the backing, followed by drying to eliminate the solvent, without resort to special compounding or application techniques. The polyacrylate elastomer readily penetrates the paper and a solution concentration can be used which is high enough to leave a weight of dried impregnant in the body of the paper which equals or exceeds the paper weight. It is not necessary to use plasticizers or compounding ingredients.

Instead of using a solution of the non-tacky polyacrylate elastomer in a solvent, an artificial "latex" type of dispersion or emulsion may be employed. While the elastomer itself can be directly dispersed in water, the preferred procedure is to disperse the monomer or a low polymer in water (using an emulsifying agent such as the mono-sodium salt of the sulfonic acid ester of lauryl alcohol) with a polymerization catalyst (such as a peroxide or ammonium persulfate) and polymerize in situ to produce a milky dispersion of the eupolymer resembling latex. This latter technique results in a stable dispersion wherein the particle size is smaller than can be conveniently secured by dispersing the preformed elastomer in water and the total cost of production is lower. The aqueous dispersion can then be used to impregnate paper or the like in making the backing, the water being subsequently removed by drying, as by passing the sheet material around heated rolls.

Instead of using a preformed non-tacky polyacrylate elastomer for coating or impregnating the fabric, the elastomer may be formed in situ. In this case the starting material as the monomer or as a low polymer (which contains if necessary sufficient thinner or solvent to give the desired viscosity and which may be in the form of an emulsion) is used to impregnate the paper, cloth or other backing sheet material, followed by heating to produce polymerization and drive off the solvent or vehicle. A polymerization catalyst, such as a peroxide (for example benzoyl peroxide or hydrogen peroxide), is preferably incorporated in the solution shortly before use. Infra-red lamp heating can be used to advantage in shortening the time required for polymerization. Ultra-violet light hastens polymerization. The impregnated sheet material may be subjected to the combined action of infra-red and ultra-violet radiation by use of suitable lamps in the drying tunnel.

*Example*

A web of creped towelling paper of porous or bibulous nature, having a weight of 27 lbs. per ream, and a stretch of about 15%, is passed through a saturating bath comprised of a 10% solution of methyl acrylate elastomer in acetone, thence between squeeze rolls set to remove excess from the paper surfaces, and thence through a tunnel dryer (temperature about 150° F.) for solvent removal. Infra-red lamps may be used to advantage to produce radiant heating and drying. The finished backing contains a weight of the elastomer about equal to the paper weight. Ethylene dichloride is another example of a suitable volatile solvent, which can be used in place of acetone.

The backing is then coated on one face with a pressure-sensitive adhesive, as by passing the backing through a knife-coater in which a solution of the adhesive is applied, followed by drying. An example of an adhesive solution for this purpose, parts being by weight, is:

| | Parts |
|---|---|
| Latex crepe rubber | 100 |
| Zinc oxide | 100 |
| Hydrogenated rosin | 60 |
| Beta-naphthol | 1 |
| Heptane (volatile solvent) | 450 |

The rubber of the above formula may be substituted for by an isobutylene polymer elastomer (a transparent rubbery mass). Various other tack-producing resins may be used in place of the hydrogenated rosin, such as rosin, ester gum, hydrogenated ester gum and hydrogenated indene resin.

A non-tacky polyacrylate elastomer of the character described for use in making the backing may also be used as a rubbery base for producing a pressure-sensitive adhesive. Thus eupolymers of methyl acrylate, ethyl acrylate and methylethyl acrylate may be compounded with a compatible tack-producing material. An acrylate polymer which is soft and tacky, as distinguished from the non-tacky rubbery elastomer, may be used in whole or in part as the tack-producing agent to produce a pressure-sensitive adhesive wherein the non-tacky eupolymer elastomer provides a tough and rubbery body of high cohesiveness and the tacky polymer produces a tacky condition, the adhesive being more cohesive than adhesive. The adhesive components may be combined by dissolving in a mutual solvent; the resulting solution being used to coat the backing, followed by drying to remove the solvent. Or a dispersion or emulsion of the tack-producing material in water may be mixed with an emulsion of the polyacrylate elastomer in water, the combined emulsion then being used to coat the backing and the water being driven off by subsequent heating. These pressure-sensitive adhesive coatings are transparent and provide transparent adhesive tapes when coated upon transparent backings (such as regenerated cellulose or cellulose-derivative films), but a reinforcing filler and opacifier, such as zinc oxide, titanium dioxide or clay, may be included in making adhesives for masking tape and the like.

The adhesive-coated web may then be slit and wound into rolls of desired width and length. This procedure results in a superior masking tape of the character described.

A flat uncreped paper may be employed where stretchability is not needed or wanted, and this may be, for example, a kraft paper. Any type of paper or paper-like sheet may be used for impregnation so long as it is sufficiently porous or bibulous to permit of adequate impregnation to result in the desired unification. It may be made in whole or in part from wood, rope or rag fibres, or from other fibrous material, natural or synthetic, adapted to the making of thin flexible sheet material of adequate porosity and adequate tensile strength after impregnation. Glass fabrics can be used, the acrylate elastomer having a strong bonding action upon glass.

Desirable types of especially thin unified paper can be made by using paper stock of a hemp fibre kind. An illustration is "Flexrope," a 100% rope paper made of reclaimed rope and characterized by long fibre length, open texture, high tensile strength and great uniformity. Another example is "Troya Tissue," made from new manila hemp fibres and characterized by the fact that the fibres largely run in one direction, so that tapes can be made having a high lengthwise tensile strength and a high crosswise tear resistance. "Dextilose" is a hemp fibre paper which has substantially the same lengthwise and crosswise tensile strength and tear resistance.

The invention is not limited to true paper as the backing. Thus a fabric of carded cotton fibres can be used. Various felted fabrics can be employed. All of these are to be understood as embraced within the term "paper" as used in the claims, distinguishing from woven fabrics. However, woven fabrics can also be used.

The fibrous backing need not be entirely saturated or impregnated with the polyacrylate elastomer. For example, a paper or cloth may be coated on one side with the non-tacky acrylate elastomer and on the other side with the pressure-sensitive adhesive, the two coatings penetrating sufficiently for anchorage and unification. Or the fabric may be coated on both sides with the acrylate elastomer, and then coated with the adhesive. Even in the case of paper, penetration need not necessarily extend to the centre, particularly if an adhesive of mildly tacky nature is used.

It has been mentioned that the non-tacky polyacrylate elastomer may be used alone, which is a valuable feature. However, it is not to be understood that compounding is excluded from the scope of the invention. Thus the acrylate elastomer may be loaded with fillers, such as zinc oxide, carbon black, whiting and clay, such as are used in rubber compounding. Compatible resins may be incorporated. Plasticizers, softeners and other modifying agents may be used, but ordinarily are unnecessary. Other compatible polymers may be blended, such as styrene and vinyl resins (for example, polyvinyl acetate and polyvinyl chloride). Or, instead of using mixed polymers, the acrylate may be copolymerized with another polymerizable material such as styrene, vinyl acetate or vinyl chloride, in proportions suitable for producing an elastomer.

Mixtures or blends of polyacrylate elastomers may be used (as for example, a mixture of the methyl acrylate and ethyl acrylate forms); or co-polymers can be used, such as copolymers of the methyl and ethyl types in which each molecule contains some methyl and some ethyl groups. Thus a methyl-ethyl co-polymer containing 25% methyl and 75% ethyl groups is very satisfactory.

As stated, the invention is not limited to masking tapes. Thus electrical tapes, protective tapes, shoe tapes, sealing tapes, edging tapes, surgical tapes, etc., can be made in which various features and advantages of the invention are exploited. Double-coated tape can be made, in which the backing (impregnated with the polyacrylate elastomer) is coated on both sides with pressure-sensitive adhesive.

If it is desired to use a particular type of pressure-sensitive adhesive which is of a nature having an affinity for polyacrylate elastomers such that adhesive tape having a backing impregnated or back-sized with the non-tacky polyacrylate elastomer cannot be readily unwound from rolls thereof due to the adhesive surface strongly adhering to the back surface which it contacts, and it is not desired to use a liner, this difficulty can obviously be overcome by back-sizing the tape with a coating of material toward which the adhesive will have only limited adhesion so as to permit of ready unwinding. This latter back-sizing may be applied over a back-sizing of the non-tacky polyacrylate elastomer if that is employed.

The bonding of the pressure-sensitive adhesive coating to the backing may be increased by using an intermediate primer coating of a character which bonds firmly to the backing and to the adhesive coating. Thus the kinds of pressure-sensitive adhesive which may be employed are not limited to those which form a direct strong bond to a backing impregnated, or sized on the inner face, with a polyacrylate elastomer. Such primer may be a blend or mixture of polyacrylate elastomer and one or more of the organic components of the adhesive, so that one phase bonds strongly to the backing and another to the adhesive coating; the primer thus linking the two together.

Having described various embodiments of my invention for purposes of illustration, but without intent to be limited thereto, what I claim is as follows:

1. A pressure-sensitive adhesive tape comprising a flexible fibrous backing impregnated and unified by a non-tacky polyacrylate elastomer of the class consisting of methyl acrylate polymers, ethyl acrylate polymers and co-polymers of methyl and ethyl acrylates, and a normally tacky and pressure-sensitive non-offsetting adhesive coating firmly united to the backing.

2. A pressure-sensitive adhesive tape wound in roll form and comprising a bibulous paper backing impregnated and unified by a non-tacky polyacrylate elastomer of the class consisting of methyl acrylate polymers, ethyl acrylate polymers and co-polymers of methyl and ethyl acrylates, and a normally tacky and pressure-sensitive non-offsetting adhesive coating firmly united to one side of the backing, said backing being resistant to splitting or delamination when the adhesive tape is unwound from a roll or removed from surfaces to which temporarily applied.

3. A masking tape wound in roll form and comprising a stretchable porous paper backing impregnated and unified by a non-tacky polyacrylate elastomer of the class consisting of methyl acrylate polymers, ethyl acrylate polymers and co-polymers of methyl and ethyl acrylates, and a normaly tacky and pressure-sensitive non-offsetting adhesive coating firmly united to one side of the backing, said tape having a dead-stretch characteristic and being readily conformed to irregular or curved outlines and surfaces, and the impregnated backing serving as a barrier to penetration of water and oils.

4. A masking tape according to claim 3 wherein the polyacrylate elastomer is a co-polymer of methyl and ethyl acrylates.

HUBERT J. TIERNEY.

REFERENCES CITED

The following references are of record in the file of this patent:

UNITED STATES PATENTS

| Number | Name | Date |
|---|---|---|
| Re. 19,128 | Drew | Apr. 3, 1934 |

OTHER REFERENCES

Neher, Article in Ind. and Eng. Chem., vol. 28, No. 3, March 1936, pp. 267–271.